Jan. 29, 1935.　　　　R. C. SABOT　　　　1,989,499
DEVICE FOR PROMOTING CHEMICAL REACTIONS AND PARTICULARLY THE
COMBUSTION OF MIXTURES OF GASES AND OTHER MATERIALS,
SUCH AS VAPORS, LIQUIDS, AND COLLOIDS
Filed Feb. 17, 1932　　　3 Sheets-Sheet 1
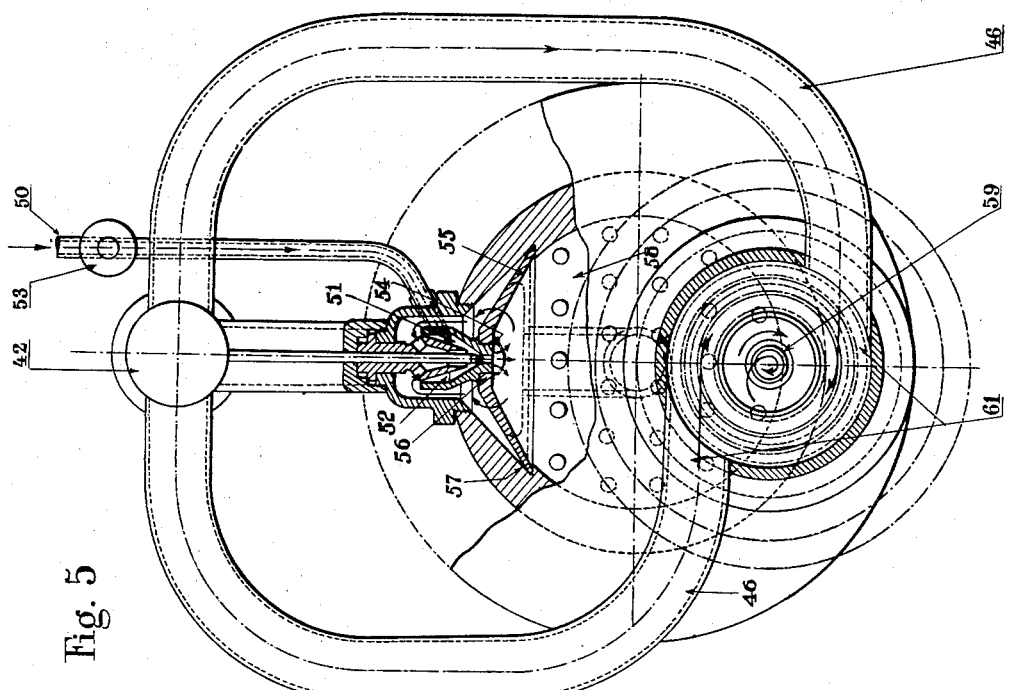
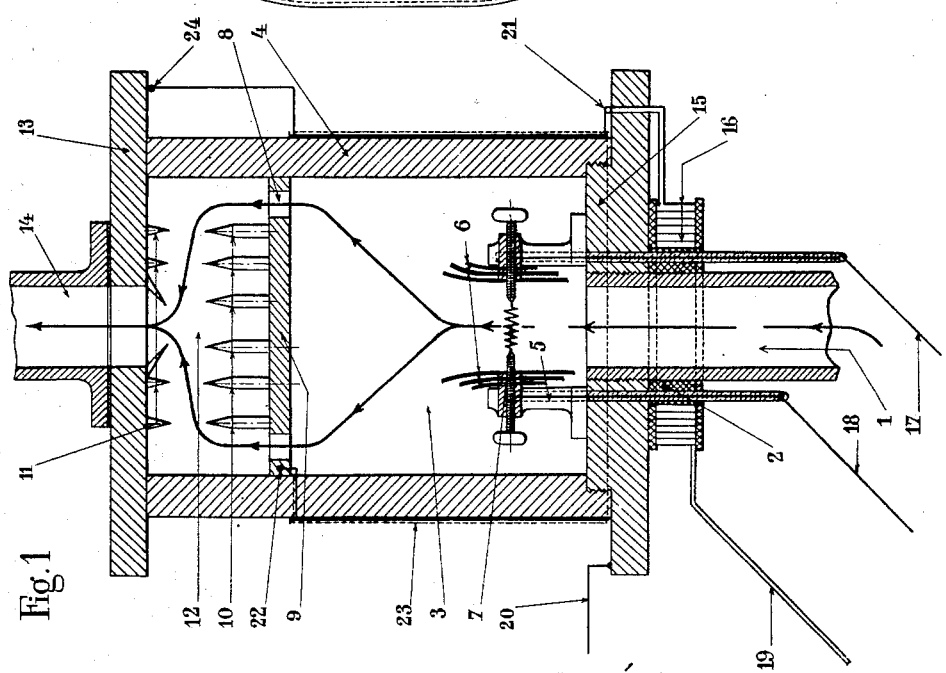
RENÉ CHARLES SABOT
INVENTOR
BY Haseltine Lake & Co.
ATTORNEYS Jan. 29, 1935. R. C. SABOT 1,989,499
DEVICE FOR PROMOTING CHEMICAL REACTIONS AND PARTICULARLY THE
COMBUSTION OF MIXTURES OF GASES AND OTHER MATERIALS,
SUCH AS VAPORS, LIQUIDS, AND COLLOIDS
Filed Feb. 17, 1932 3 Sheets-Sheet 2
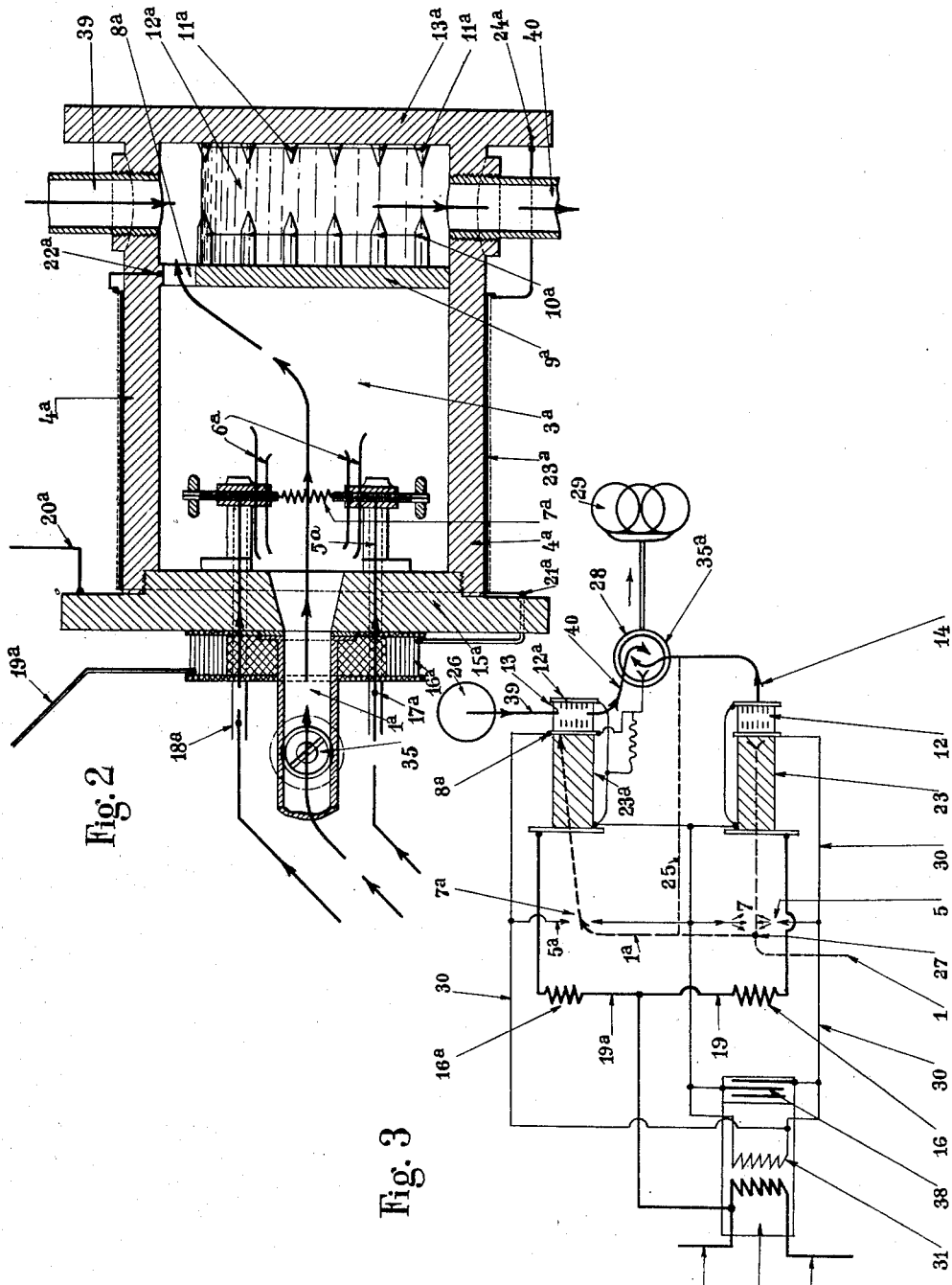
INVENTOR
RENÉ CHARLES SABOT
BY Haseltine, Lake & Co.
ATTORNEYS

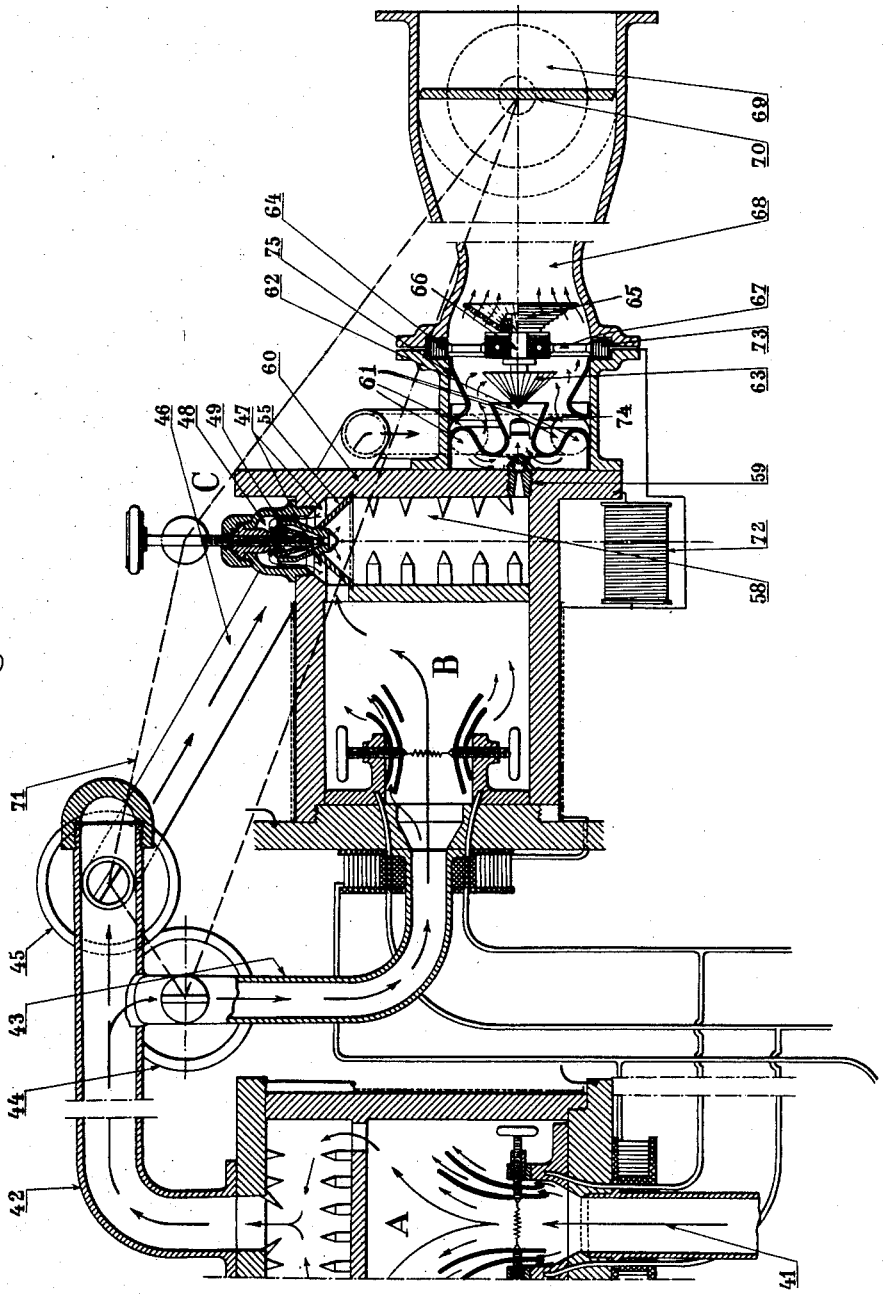

Patented Jan. 29, 1935

1,989,499

UNITED STATES PATENT OFFICE 1,989,499

DEVICE FOR PROMOTING CHEMICAL REACTIONS AND PARTICULARLY THE COMBUSTION OF MIXTURES OF GASES AND OTHER MATERIALS, SUCH AS VAPORS, LIQUIDS, AND COLLOIDS

René Charles Sabot, Paris, France

Application February 17, 1932, Serial No. 593,678
In France March 18, 1931

3 Claims. (Cl. 204—31)

This invention relates to devices for ionizing and electronizing mixtures of gases, vapors, liquids, colloids, solids, and particularly of combustion-supporting agents and carburetting agents for feeding all types of internal combustion engines; for the purpose of promoting chemical reactions, and specifically, the combustion of the mentioned mixtures.

Among the sources of energy producing an ionization and an electronization of gases and vapors, can be cited the high tension and high frequency electric spark or effluvium, the rays emitted by radioactive substances, ultra-violet rays, X-rays, cosmic radiations, etc.

It has also been observed that certain chemical reactions, combustions in particular, determine an ionization of the medium. Radioactive substances have a powerful ionizing action and the surfaces of certain usual metals even emit ions.

By ionization and electronization, under the action of various sources of energy, the molecules of gases and vapors are cracked into atomic ions, charged with electricity, and the atoms are cracked into very movable negatively charged electrons, and into less movable positively charged corpuscles.

The present invention is based on the fact that the ionizing action produced by a mixture of gases, vapors, liquids, solids, colloids, either separately or simultaneously, is capable of modifying the initial equilibrium and of finally determining a new stabilization which takes place with formation, adjacent to the ions, of atomic groups, and of molecular agglomerates; according to the nature of the chemical constituents of the mixture, stable chemical compounds not initially existing may be formed.

For instance, in the case of air and of water vapor, the presence of ozone, or even of ozonides, and of oxygenated water has been observed, which are formed by union of oxygen ions and of oxygen molecules, or of water molecules. In the case of air and of a hydrocarbon for instance, adjacent to the ions, will be formed ozone, ozonides and compounds of partial oxidation.

As in the case of substances cracked by dissolution, the ionized stabilization of the mixture thus obtained by ionizing action facilitates the chemical reactions of the constituents which reactions are liable to occur as soon as the required conditions are obtained.

The devices embodying the present invention are designed to subject the gases and materials which are capable of reacting together or with the gases or else with bodies extraneous to the mixture, to the action of certain of the above-mentioned ionizing agents, either simultaneously or successively and separately or in combination. This ionization can be effected on a portion of the constituents or on the totality thereof, either before, during or after mixing.

The ions and electrons promote the extreme dispersion of solid, liquid or colloidal substances thus placed in stable suspension in the gaseous medium. These substances can react either together, or with the sustaining gas, as soon as the required conditions are obtained.

By way of example of application of this apparatus, the following applications can be cited:

(1) Production, for explosion engines, of a homogeneous and stable mixture of air and carburetting agent: The sparks and effluvia for instance (grouped in series or in quantities) are applied to the air; their action subsequently facilitates the thorough mixing of this ionized air with the carburetting agent, heavy oil for instance. This oil can also be subjected to the action of various ionizing agents which, determining partial molecular division, thus facilitates the perfect subsequent combination with the oxygen of air upon explosion. The mixture formed can also be ionized, provided, of course, the combination is not thus effected, but only prepared.

This application is so much the more advantageous that the simultaneous formation of a slight quantity of ozone and ozonides will facilitate the explosion.

(2) Chemical reaction between two or more solid, liquid, or colloidal bodies placed in stable suspension in a sustaining gas previously ionized.

The apparatus of the invention particularly allows of determining the reaction of substances which would be decomposed by dissolution.

The reaction will be facilitated by the extreme division of the material and by the intimate contact of the reacting particles forming the groups about the ions and electrons.

(3) Diffusion of dyeing materials.

Dyeing materials placed in suspension as such or in solution, in a previously ionized medium, are precipitated on the body to be treated by electrostatic attraction, which is effected for that purpose; the dyeing action can be localized by partial interposition of a dielectric.

(4) Preparation of biological products, serums, disinfectants, insecticides, etc., in a liquid, solid, or colloidal form.

The placing in stable suspension in a sustaining gas, previously ionized, allows, whilst avoiding the presence of foreign or extraneous materials capable of modifying the action (water, alcohol or the like), to obtain the maximum effect owing to the condition of extreme division of the product.

An application of the apparatus of the invention which is of particular interest, is when the same is used for ionizing a combustion-supporting or carburetting agent, by the action of a high tension spark and of high frequency effluvium. It has, in fact been observed that high frequency oscillations increase atomic mobility and facilitate molecular penetration.

Combustion-supporting agents and carburetting agents are treated separately before they are mixed in the mechanical dispersing apparatus and eventually in this apparatus itself. The air or mixture of air and of suitable bodies is subjected to the action of the effluvium, after having been or not subjected to the action of the spark.

Mineral oil, or any other carburetting agent, eventually emulsified beforehand by a gas or gaseous mixture, ionized, electronized or not, can also be subjected to the action of the effluvium, the distance and location of the electrodes being function of the resistivity of the carburetting agent.

The action of the effluvium can also intervene upon mixing of the combustion-supporting agents and carburetting agents, effected in a mechanical dispersing apparatus or the like.

Figs. 1, 2 and 3 of the drawings illustrate, by way of example, ionizing and electronizing devices, and this in the most general case in which are treated, on the one hand, combustion-supporting agents and carburetting agents separately, on the other hand, their mixture upon dispersion.

Figs. 4 and 5 illustrate a device for emulsifying heavy oil and super-ionized air, with pulverization as perfect as possible of the emulsion obtained, this device being utilizable as carburettor for internal combustion engines of all types.

Fig. 1 illustrates an example of the device in question for the combustion-supporting agent. Air or any gaseous mixture, or also any mixture of gas and vapors, liquids or solids in suspension, arising from the atmosphere or from a tank, with or without the intermediary of a compressor, enters an ionizing chamber 3 through a tube 1, and passes at 7 through the spark gap of a discharger 5. This discharger can also be located outside the gaseous stream. In the case described, and for creating a zone of diffusion in the action of the sparks on the gaseous stream, blades or vanes 6 are secured on the discharger and act by extra-currents and modification of the electromagnetic field. A block 15 is secured to the walls 4 of the chamber 3; 2 designates a block insulating a self-induction coil 16, which receives the current at 19 and is connected at 21 to a resonator, which, preferably, is peripherally arranged. The terminal 22 of the resonator transmits the high frequency current to a plate 9. This plate 9 is perforated with several holes 8, through which the gaseous stream enters the zone 12 of the high frequency effluvia produced between the dispersive points 10 and 11; 13 designates a cover rigid with 4; 14 is the outlet tube of the ionized and electronized gaseous stream; 20 and 24 designate terminals, and 17 and 18 the feeders of the discharger 5.

Fig. 2 relates to the ionization and electronization of the carburetting agent, with or without previous emulsion. A tube 1a allows to supply either air, or any other gas or gaseous stream, under pressure or not; the supply can also take place through a branch pipe for the gaseous stream previously ionized and electronized (see Fig. 1). A valve 35 serves to control or even to cut off the supply of the gaseous stream in a chamber 3a. If previous emulsion is not to be effected at any moment, the tube 1a will be dispensed with. The casing 4a forms with 13a and 15a a rigid unit; on the block 15a is mounted a discharger 5a, and the sparks are produced at 7a, the diffusion being ensured by small blades 6a.

As in the preceding figure, the discharger can be located outside the device described. The gaseous stream is admitted, through a suitable aperture 8a, according to the path indicated by arrows, in the effluvium zone where the carburetting agent is placed; this aperture 8a can be dispensed with or enlarged, at will, according to the method of ionization and electronization adopted. On the walls 9a and 13a are secured the dispersive points 10a, 11a for the effluvia. The carburetting agent, mineral oil, gasoline or the like, capable of being ionized and electronized, is admitted, through a tube 39, into a chamber 12a. After the effluvia have effected their action, the carburetting agent issues at 40 in order to be sent, with or without the intermediary of a pump, either in a mixing and dispersing apparatus, or in any system for utilization.

A self-induction coil 16a is fed by a line 19a; 17a and 18a designate the supply terminals of the discharger 5a; a resonator 23a is supplied by a terminal 21a; the high frequency current is transmitted, through a terminal 22a, from the resonator to the plate 9a; 20a and 24a designate the terminals of the apparatus.

Fig. 3 is a diagrammatic view of the entire device, in one application, with ionization and electronization, on the one hand, of air or other combustion-supporting agent, on the other hand of oil or other carburetting agent, or even of the mixture in the dispersing apparatus. The stream of air or suitable gases enters at 1 and passes to the discharger 5. 1a designates a branch pipe which can be connected at will at 27 on the pipe line 1, whilst 25 is a branch pipe which can supply at will non-ionized gas to a dispersing apparatus 28; it is therefore possible to send in the latter a gaseous stream, treated or not, and, in the latter case, it would be the carburetting agent which alone would be ionized.

The aperture 8a can be controlled or closed at will, according as the carburetting agent (mineral oil or the like) contained in a tank 26 is emulsified; 12 and 12a designate the effluvium chambers of the apparatus illustrated in detail in Figs. 1 and 2; 16 and 16a designate the self-induction coils fed by the primary coil 33—34 of a transformer 32; 38 is a condenser. The source of current feeding 33—34 can be of any type: alternators, accumulators, Ruhmkorff coil, rotary magnetos with breaking devices or not. 23 and 23a designate resonators for the high frequency, supplied by lines 30; these lines can also feed a device producing rotary or fixed effluvia in the mixing and dispersing apparatus 28; 31 is the secondary of the transformer. At 29 is diagrammatically illustrated the engine which receives in its cylinders the ionized and electronized explosive mixture.

The device described above can be used with all types of internal combustion engines.

The apparatus illustrated in Figs. 4 and 5 is a system of dispersion specially provided for utilization of ionized and electronized gases and allowing, on the other hand, to cause a rotary electric effluvium to act upon ultimate mixing of the combustion-supporting agent and carburetting agent.

The conditions of operation of an explosion engine are in fact so much the more favorable as, for a carburetting agent having given characteristics, it is possible to exactly control and maintain constant the composition of the mixture of combustion-supporting agent and carburetting agent and to have the required difference between the temperature of the mixture at the time of use and that of the self-ignition, with the required ratio of compression.

The changes in the running conditions of the engine can then be obtained by controlled addition of combustion-supporting agent or of carburetting agent.

In such conditions, of homogeneity of the mixture suited to given working conditions, it is possible to avoid any cracking producing particularly the fouling of the parts of the engine, and any condensation of unburnt carburetting agent which risks of producing a dilution of the lubricating oil, and thus the efficiency is carried to the maximum with the minimum of expenses.

Owing to ionization and electronization, the mixture of combustion-supporting agent and carburetting agent is remarkably stable, and is insensible to important variations of temperature or pressure, to the changes of speed in magnitude or direction, etc.

Fig. 4 is an elevation of the entire apparatus, and Fig. 5 is a side view in the region of the emulsifying device and of the sprayer provided with a rotary dispersing device (parts C and D).

A designates the system for ionizing and electronizing air or any suitable combustion-supporting agent such as that previously described. Air enters through 41 and, after it has been subjected to the action of the spark and effluvium, issues through a conduit 42. A branch pipe 43 leads a portion of the air (adapted to emulsify oil or any other carburetting agent) into the apparatus B, the control of the quantity of air admitted taking place at 44. A conduit 46 leads, on the other hand, the air into the apparatus D, the control of the quantity of air admitted taking place at 45.

The apparatus B is of the type of those previously described; the air is super-ionized therein by the sparks, and enters the chamber 47 in which constant circulation is ensured, this chamber forming an integral part of the device C. The oil, or any other carburetting agent, is admitted at 51 (Fig. 5) by a pipe line 50 (control at 53); this oil is drawn along at 52 by the air sucked or under pressure which, after passing through ports 48, is admitted according to the axis of the device. An emulsion thus takes place and the mixture issues through an emulsifying apparatus 54, having several orifices, and enters an effluvium chamber 58. The body of the device is mounted on an annular chamber 57 and, by simple pressure, by conical adjustment, forms a fluid-tight structure. A rod 49 controls the admission of the mixture, whilst the admission of the oil is controlled at 53 and a constant emulsifying action can thus be obtained.

The chamber 58 of the apparatus B is provided with an injector 59, inserted in a plate 60 and through which the ionized emulsion passes to reach the expansion chamber of the apparatus D.

The ionized and electronized air (or any other gas), which has not been used for the emulsion, is admitted, through the pipe line 46, at 61, in the mixing device (expansion chamber D) having a special shape and the total volume of which is divided into two portions adjustable at will by rotation of an annular member 74, so that an eddy is produced and draws the emulsion along by ensuring complete vaporization. For that purpose, the annular member 74 has a special shape, as shown in Fig. 4. A striated cone 63 receives the emulsion issuing from the injector 59, or thrown back by 74, and projects it upon a cone 75, or at least a part of it; the emulsion then encounters the other portion of the air (or other fluid) admitted at 61, and the still more intimate mixture is subjected to an annular stirring by a frustum-shaped member 65 provided with openings obliquely arranged relatively to the gaseous stream. A homogeneous and stable mixture is thus obtained at 68, which reaches a choke tube 69, in which is arranged a throttle valve 70 controlling the admission of the gaseous mixture in the engine.

The frustum-shaped member 65 is set in rotation by the gaseous stream which passes through its oblique openings; this member 65 is rigid with a shaft 66 and drives the cone 63. The shaft 66 is held by a spider 67 rigid with 64, with interposition of a ball bearing.

The automatic adjustment of the entire device can be effected by rendering rigid together, by any suitable rigid or flexible means, the individual inlet control members 53, 44 and 45; it is thus possible to obtain without complication any desired speed of operation.

For ensuring a perfect stabilization by ionization and electronization, the electric effluvium is at the last caused to act, at the time of ultimate mixing, between the rotary cone 63 and the spraying nozzle 59. For that purpose, a small resonator 72 is mounted in shunt on the resonator of the apparatus B, with electric communication with the rotary system 63—66—65, through the medium of 64 and of the spider 67. A rotary effluvium is thus produced in the chamber 62. The various resonators can be fed by distinct oscillatory circuits.

The chief advantages of the invention as embodied in the present apparatus which has just been described, as far as the applications indicated by way of example are concerned, can be summed up as follows:

Possibility of utilizing, without essential modification (other than the replacement of the carburettor), a carburetting agent of low price and of high calorific power, reducing moreover the risk of fire;

Production of a homogeneous mixture, of distinctly defined composition, ensuring a complete combustion (elimination of any fouling) and ensuring the maximum thermal efficiency; the stability of the mixture is such that use may be made of a single carburettor for several cylinders;

Regularity and higher power of the explosion, owing to the composition and homogeneity of the explosive mixture.

Variations may be resorted to and parts used without others, within the scope of the invention.

Having now fully described my invention, I claim:

1. Device for ionizing and electronizing combustible and combustion-supporting fluids, respectively, comprising a first vessel having a perforated partition which divides it into two compartments, one of these compartments having an inlet orifice for the combustion-supporting fluid and the other having an outlet orifice, means for producing electric sparks and effluvia in these compartments, a second vessel having also a partition which divides it into two compartments and provided with an orifice, one of these compartments having an inlet orifice, and the other having an outlet orifice, a conduit connecting the outlet orifice of the first vessel to the inlet orifice of the second vessel, means for producing electric sparks and effluvia in both compartments of the second vessel, an injecting device mounted in the wall of the outlet compartment of the second vessel and adapted to inject the combustible fluid in a pulverized condition in the said compartment, this device being adapted to be traversed by the combustion-supporting fluid issuing from the first compartment through the said orifice of the respective partition, a mixing and dispersing device having a central inlet orifice communicating with the outlet orifice of the said vessel, side inlet orifices connected to the said conduit between both vessels, and an outlet orifice.

2. In a device for ionizing and electronizing fluids, an apparatus comprising a vessel in which is arranged a partition dividing it into two compartments, this partition having at least one orifice ensuring communication between both compartments and the latter having moreover orifices for the admission and issue of a fluid, respectively, a spark discharger in the inlet compartment of the said vessel, effluvium combs in the second compartment, the inlet and outlet orifices of the said vessel being so located as to compel all the fluid to pass through the said discharger and between the effluvium combs, and a resonator arranged about the said vessel.

3. In a device for ionizing and electronizing fluids, a mixing and dispersing apparatus comprising a circular vessel having at its ends inlet and outlet orifices and, at its periphery, two inlet orifices directed tangentially, an injecting nozzle in the inlet orifice, partitions forming in the said vessel successive divergent passages opposite the said injector, and a rotary device comprising a support in the said vessel, a rotary shaft mounted in this support in alinement with the said passages and the said injector, a striated cone and a perforated cone on the said shaft, the said perforated cone having its perforations obliquely directed so that the fluid stream passing through them compels it to rotate with the said shaft and with the said striated cone, and means for producing effluvia between said injector and said striated cone.

RENÉ CHARLES SABOT.